United States Patent [19]

Donaldson

[11] 4,018,641

[45] Apr. 19, 1977

[54] BELTING AND SIMILAR ARTICLES

[75] Inventor: William Kenneth Donaldson, Beverley, England

[73] Assignee: J. H. Fenner & Co. Limited, Hull, England

[22] Filed: Aug. 21, 1975

[21] Appl. No.: 606,349

[30] Foreign Application Priority Data

Aug. 21, 1974 United Kingdom ............ 36695/74

[52] U.S. Cl. .............................. 156/137; 156/139; 156/582; 156/583; 264/231; 264/236; 264/319; 425/384; 425/501

[51] Int. Cl.² .......................................... B29H 7/22

[58] Field of Search .......... 156/582, 583, 137, 139; 425/28 B, 384, 501; 264/236, 347, 319, 310, 312, 294, 296, 231, DIG. 67

[56] References Cited

UNITED STATES PATENTS

| | | | |
|---|---|---|---|
| 2,142,972 | 6/1939 | Bieren | 264/347 |
| 2,867,845 | 1/1959 | Sauer | 425/28 B |
| 3,004,289 | 10/1961 | Missback | 425/384 |
| 3,126,580 | 3/1964 | Paschke | 425/384 |
| 3,152,204 | 10/1964 | Sauer | 264/347 |
| 3,700,365 | 10/1972 | Spicer et al. | 425/384 |

*Primary Examiner*—Edward G. Whitby
*Attorney, Agent, or Firm*—Diller, Brown, Ramik & Wight

[57] ABSTRACT

In the heating or cooling of conveyor or power transmission belts or similar articles during manufacture, successive regions of the article are presented to a zone wherein they are subjected to pressure accompanied by simultaneous heat transfer, the displacement of the article between applications of pressure being short compared to the length of said zone. Only preferred apparatus comprises a continuously rotatable heated drum over which said articles are passed, a tensioning roller having its axis parallel to that of the heated drum and movable towards and away from the drum, at least one curved, heated platen or equivalent member movable towards and away from the drum for exerting simultaneous heat and pressure on said articles, and means mounting said platen member for limited arcuate movement circumferentially of said drum and whereby said member is enabled when urged against said drum to move circumferentially and in synchronism with the same.

10 Claims, 3 Drawing Figures

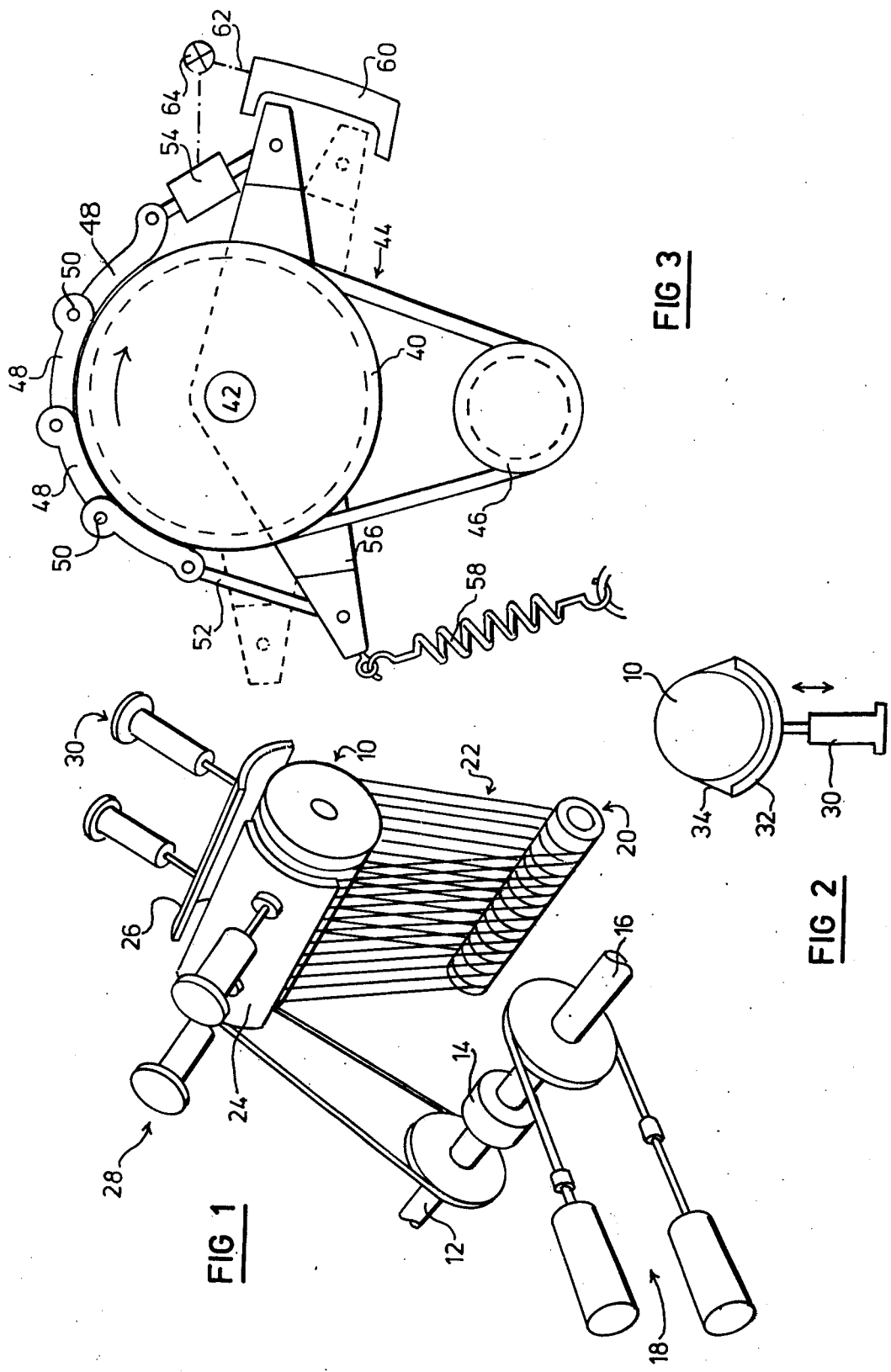

BELTING AND SIMILAR ARTICLES

This invention relates to a method of and apparatus for effecting heat transfer to or from conveyor belting, power transmission belts, V-belts and similar articles during the process of their manufacture.

Various methods are known for vulcanising for example, V-belts and similar ring shaped or long length articles but two methods have een particularly favoured by industrial rubber processors because of their efficiency and simplicity. One of these widely used methods is the press cure method in which successive lengths of the belts are cured in a heated press. Usually the extreme ends of the press are kept cooled to provide a temperature gradient and to prevent heat softened uncured rubber from being extruded from the ends of the press. However, the effect of the stepping overlap in the region of the temperature gradient constitutes a difficulty because the belt when completed is not uniformly cured along its length. There is also a disadvantage in that usually there is a peak labour demand each time the press is opened and the belt moved to the next position.

Another widely used method is rotary vulcanisation whereby the belt is cured whilst in contact with a slowly rotating drum, the drum being heated and suitably profiled at its outer periphery. Pressure is applied to the top surface of the belt by a steel band which is free to rotate with the drum so that there is no relative movement between the drum, the belt and the steel band around the arc of contact. Additional heat is applied to the outer surface of the belt by radiant heaters.

Rotary vulcanisation overcomes some of the disadvantages of press curing but suffers from the fact that temperature is difficult to control due to poor heat transfer characteristics from the heaters through the pressure band.

In its broadest aspect, the present invention provides a method or similar articles during manufacture in which successive regions of the article are presented to a zone wherein they are subjected to pressure accompanied by simultaneous heat transfer, the displacement of the article between applications of pressure being short compared to the length of said zone.

The invention thus combines some of the features of both press moulding and rotary vulcanisation whilst overcoming some of the disadvantages inherent in these two systems.

In one embodiment of the present invention a method for vulcanising V-belts or similar articles comprises arranging the belt so that it is contacted over part of its length by an arc of the outer surface of a heated drum, said drum being adapted to rotate with an intermittent motion so that successive portions of the belt are engaged by the drum surface and transported through an arc in successive stages, being subject to the application of heat and pressure during each period when the drum is stationary. The arc of each transportation step is short compared to the arc of contact.

A modification of the method according to the invention comprises continuously rotating the drum and intermittently correspondingly arcuately displacing one or more heated platens or equivalent members whilst simultaneously urging said members against said drum, the arcuate movement serving to maintain synchronism between said members and said drum, the extent of said arcuate movement being short in relation to the arc of contact of the belt or other article with the drum.

The method of the invention can be carried out using apparatus comprising a heated drum suitably profiled at its outer periphery, drive means for rotating said heated drum with an intermittent motion, a tensioning drum, the axis of which is parallel to that of the heated drum and which is movable towards or away from the heated drum and at least one heated curved pressure platen radially spaced from and moveable in relation to the said heated drum.

Apparatus for carrying out the modified method proposed by the invention comprises a continuously rotatable drum, at least one curved heated platen or equivalent member movable towards or away from the drum for exerting simultaneous heat and presure on a belt or other article passing around the drum and means mounting said platen or equivalent member for limited arcuate movement circumferentially of said drum and whereby said member is enabled in one direction of said circumferated movement to remain in synchronism with said drum whilst pressed against the same.

Preferably, a flexible anti-stick element is interposed between the press platen and the surface of the drum. Conveniently, this anti-stick element may comprise commercially available release paper fed continuously into the arc of contact of the belting or other article with the heated drum.

For a number of reasons, for example in order to minimise the load on the shaft which supports the heated drum it is preferred to provide a plurality of heated pressure platens.

The invention will be described further, by way of example, with reference to the accompanying drawings, in which:

FIG. 1 is a diagrammatic perspective view of a part of one apparatus embodying the invention;

FIG. 2 is an end elevation of a part of a modification thereof; and

FIG. 3 is an end elevation of an alternative apparatus.

In the apparatus shown in FIG. 1, a drum 10 having an outer surface profiled to accept belts intended to be vulcanised is arranged to be intermittently rotated or indexed from a shaft 12 connected by a sprag clutch 14 to a primary shaft 16 which is oscillated by a fluid piston and cylinder assembly generally indicated at 18. A tension roller 20 having an appropriately profiled outer surface is supported in spaced parallel relationship beneath the vulcanising drum 10 as viewed in FIG. 1 and belts 22 undergoing vulcanisation are supported on the drum 10 and tension roller 20. A pair of arcuate platens 24 and 26 respectively carried on fluid actuated piston and cylinder assemblies 28 and 30 are positioned in axially parallel and close spaced relation to that region of the drum 10 around which the belts 22 pass, the platens being provided with steam or electrical heating means (not shown) as desired. By virtue of the fluid actuated assemblies 28, 30 the platens are movable radially towards and away from the drum 10. Although the illustrated apparatus employs two platens, it will be appreciated that a greater number may be used if desired.

In the operation of the apparatus described with reference to FIG. 1, the drum is indexed around via the drive from the indexing piston and cylinder assembly 18, the drum 10 itself being heated in any convenient manner, so that the belts 22 are caused to pass in stepwise manner across the heated drum surface. On each occasion that the drum 10 becomes stationary, the actuating cylinder assemblies 28, 30 are operated to urge the platens 24 and 26 into engagement with the drum whereby in addition to being heated by the drum and the platens the belts 22 are also subjected to pressure. In this way the invention enables vulcanisation to be effected under accurate temperature control of the drum and the platens and at a rotary indexing speed which in conjunction with the temperature control is calculated to achieve satisfactory vulcanisation without incurring the disadvantages which can arise from too long an exposure to elevated temperature. As will be appreciated, further control over the vulcanising conditions to which the belts are subjected results from their passage in incremental fashion through the treatment zones with which the platens 24 and 26 register since each portion of a belt corresponding to one incremental step in fact requires several such steps to pass completely through the zones covered by the platens and it is the total dwell time in those zones at the selected temperatures and pressures which determines correct curing of the rubber material.

FIG. 2 illustrates a modification of the apparatus shown in FIG. 1 wherein the tension roller 20 is replaced by a so-called walking shoe 32 which is mounted on fluid actuated assemblies similar to the piston and cylinder assemblies 28, 30 so as to be movable radially towards and away from the drum 10. The shoe 32 is generally part-cylindrical in shape and has a profiled outer surface for accepting the belts to be vulcanised. By making the part-cylindrical shoe 32 of a suitable radius, it can be mounted so as to be substantially concentric with the drum 10, thus being capable of very closely approaching the outer surface of the drum 10. With the shoe in this position it is then possible to arrange on the drum 10 and the shoe, belts which are very much shorter than those which can be accepted by the drum and tension roller previously described, one such belt being diagrammatically indicated at 34 in FIG. 2.

Another modification of the invention is shown in FIG. 3 wherein a continuously rotating drum 40 carried on a shaft 42 has its outer surface profiled to receive belts 44 to be vulcanised, the belts 44 also passing around a tension roller 46.

Overlying a part of the drum surface is an assembly of heated shoe members 48 which are articulated to one another as at 50 to constitute a platen by which the belts 44 may be subjected to pressure against the drum. For this purpose, the platen assembly is secured at one end by means of a link 52 and at the other end by means of a hydraulic ram 54 to a rocking lever 56 which is pivotally mounted at its centre on the shaft 52. The lever end adjacent the link 52 is biased in an anticlockwise direction by a spring 58, whilst the opposite lever end engages in a yoke 60 which is connected as diagrammatically shown at 62 to a hydraulic flow control valve 64 acting to control expansion and contraction of the ram 54.

In operation, with a plurality of belts 44 positioned around the drum 40 and tensioning roller 46 and with the drum 40 continuously rotating at a suitable speed, heat and pressure are applied to the belts by repeated contraction and expansion of the ram 54. Contraction of the ram 54 will be seen to tighten the platen assembly 48, 50 against the drum 40 with the result that, while the ram remains contracted, the platen assembly is carried around by the rotation of the drum. When the ram is expanded, the spring 58 returns the platen assembly to its anticlockwise limit. Expansion and contraction of the ram 54 at intervals such that the dwell time of the belts 44 against the drum 40 remains short compared to the time of travel of the belts over their whole arc of contact with the drum is achieved by opening and closing of the hydraulic valve 64. Valve 64 in turn is actuated by movement of the yoke 60, which is displaced responsive to rocking movement of the lever 56.

Although the invention has been described in connection with the vulcanisation of endless belts of relatively small dimensions, for example fan belts for automobiles, it is applicable to continuous lengths of belting such as are used for example for conveyors. The invention accordingly includes within its scope and apparatus comprising incremental drive means for presenting belting in incremental steps to a zone in which it is subjected to pressure accompanied by simultaneous heat transfer in timed relationship relative to the incremental movement. Such apparatus may include a drum similar to the drum 10, of FIG. 1 with comparable platen assemblies but with the tension roller replaced by supply and take-up spools for the belting to be vulcanised and, if required, guide rollers and/or idler rollers with or without belt tensioning means dependent upon the operational conditions.

I claim:

1. A method of treating by selectively heating and cooling articles in the form of conveyor and power transmission belts and the like during manufacture, said method comprising the steps of presenting limited regions of the article successively to a treatment zone of preselected length wherein the articles are subjected to pressure accompanied by simultaneous heat transfer, displacing the article through said zone between applications of pressure and heat transfer with the extent of article displacement being short compared to the length of said zone.

2. A method according to claim 1, comprising the additional steps of registering an article over part of its length with an arc of the outer surface of a heated drum, engaging successive portions of said article with the drum surface to transport an article in successive transportation stages around said arc, the length of each transportation stage being short compared with the length of said arc, and said heat transfer and application of pressure includes applying heat and pressure to an article during each transportation stage.

3. A method according to claim 1, comprising the additional steps of registering an article over part of its length with an arc of the outer surface of a heated drum, engaging successive portions of said article with the drum surface to transport an article in successive transportation stages around said arc, the length of each transportation stage being short compared with the length of said arc, and an article is contacted with the drum over said part of the article length and the drum is intermittently rotated, the heat and pressure being applied to an article on each occasion that the drum is stationary.

4. A method according to claim 2, wherein the article is intermittently contacted with said drum and said drum is continuously rotated, the heat and pressure being applied to an article on each occasion that said intermittent contact is effected.

5. Apparatus for vulcanizing belts and similar articles comprising a heated drum over which said articles are passed, said heated drum having an axis of rotation, drive means connected to said drum for rotating said drum with an intermittent motion, an arcuate tensioning element having an axis of curvature parallel to that of the heated drum, means mounting said tensioning element for movement towards and away from said drum, at least one heated curved pressure member, means mounting said pressure member radially spaced from and radially movable in relation to said drum and for urging said platen member directly against articles carried by said drum while said drum is stationary, said intermittent motion of said drum being short compared with the total arc of contact of articles with the drum.

6. An apparatus according to claim 5, wherein said tensioning element is in the form of a part-cylindrical shoe mounted concentrically relative to said heated drum and said movement of said shoe is radial relative to said drum.

7. Apparatus for vulcanizing belts and similar articles, comprising a heated drum over which said articles are passed, means mounting said drum for rotation about an axis and means for continuously rotating said drum, a tensioning roller having an axis of rotation parallel to that of the heated drum and means mounting said tensioning roller for movement towards and away from the drum, at least one curved heated member, means mounting said member for movement towards and away from the drum for exerting simultaneous heat and pressure on articles passing around said drum, said means mounting said heated member for limited arcuate movement circumferentially of said drum with said drum and articles carried thereby and whereby said member is enabled when urged against articles carried by said drum to move circumferentially and in synchronism with said drum and articles.

8. Apparatus according to claim 7 wherein said heated member is part of linkage engaged around an arcuate portion only of said drum, said means mounting said heated member includes tensioning means for tensioning said linkage, and means for automatically releasing said means after each said limited arcuate movement.

9. Apparatus according to claim 8 wherein said tensioning means includes fluid motor means and a control therefor coupled to said linkage for actuation thereby after each said limited arcuate movement.

10. Apparatus according to claim 5 wherein said tensioning element is a rotatable roller.

* * * * *